United States Patent [19]

Tetaz et al.

[11] Patent Number: 4,619,681
[45] Date of Patent: Oct. 28, 1986

[54] METHOD AND APPARATUS FOR MEASUREMENT OF STRESS IN FLOAT GLASS

[75] Inventors: Roger Tetaz, Beauchamp; Philippe Vizet, Bourg La Reine, both of France

[73] Assignee: Saint-Gobain Recherche, Aubervilliers Cedex, France

[21] Appl. No.: 724,149

[22] Filed: Apr. 17, 1985

[30] Foreign Application Priority Data

Apr. 16, 1984 [FR] France ................. 84 06182

[51] Int. Cl.$^4$ .............. C03B 17/06; G01B 11/18
[52] U.S. Cl. ........................... 65/29; 65/99.2;
65/1.58; 65/182.1; 356/35; 356/239
[58] Field of Search ............ 65/29, 99.2, 158, 182.1;
356/239, 35

[56] References Cited

U.S. PATENT DOCUMENTS

| | | | |
|---|---|---|---|
| 2,993,402 | 7/1961 | Dunipace et al. | 88/14 |
| 3,124,637 | 3/1968 | Heitzer | 356/35 |
| 3,508,899 | 5/1970 | Ward | 65/162 X |
| 3,656,854 | 4/1972 | Bricker et al. | 65/158 X |
| 3,799,679 | 3/1974 | Simko | 356/200 |
| 3,811,775 | 5/1974 | Abu-Saud | 356/35 |
| 4,043,780 | 8/1977 | Bricker et al. | 65/29 |
| 4,401,893 | 8/1983 | Dehuysser | 356/239 |
| 4,523,848 | 6/1985 | Gorman et al. | 356/35 X |

FOREIGN PATENT DOCUMENTS 2333236 of 1977 France.
57-82726 of 1982 Japan.

OTHER PUBLICATIONS

On-Line Measurement of Membrane Stesses in Float Glass, R. Gardon et al., ISA Transaction—vol. 17, No. 2, pp. 3-8, 9-2-78.

Primary Examiner—Arthur Kellogg
Attorney, Agent, or Firm—Pennie & Edmonds

[57] ABSTRACT

The invention relates to the measurement of stresses in float glass. In a process, the stresses in the glass are continuously determined by scanning the glass over its entire width and simultaneously measuring the temperature of the glass at each location scanned. A measurement of double refraction representing stresses is combined with the temperature measurement to establish values of the permanent stresses in the glass. The invention includes apparatus for carrying out the process.

13 Claims, 9 Drawing Figures

METHOD AND APPARATUS FOR MEASUREMENT OF STRESS IN FLOAT GLASS

TECHNICAL FIELD

The invention relates to a process and apparatus for carrying out the process of measurement of stresses in float glass. The measurement of stresses may be taken as the float glass moves along a production line.

BACKGROUND OF THE INVENTION

During the treatment of annealing of the glass, following casting of the glass ribbon an effort is made to reduce the stresses as may be present in the glass ribbon to acceptable values. The annealing treatment should also make it possible to eliminate the risks of fracture of the glass ribbon, and particularly the "snaking" phenomenon at the moment of cutting. The "snaking" phenomenon is particularly difficult to control when it occurs.

It is well known that the temperature of a glass ribbon may be rebalanced by localized heat treatments to reduce stresses. However, to accomplish this end it is necessary to take a measurement of stresses as quickly as possible so that corrective treatment may be made continuously and as soon as possible along the path of movement the glass ribbon.

Knowledge of any permanent stresses as may exist in a float glass ribbon is important to permit the optimizing of the cut. Thus, knowledge of the permanent stresses in the float glass ribbon makes it possible to select a cut which will achieve a maximum number of pieces of glass in which the stresses are acceptable. In other words, knowledge of permanent stresses makes it possible to reduce the part of the glass produced that does not meet a set standard.

Traditionally, optical means have been employed to measure stresses on the float glass ribbon. The presence of stresses on the float glass ribbon is revealed by the appearance of a double refraction of the glass. Detection and measurement of this double refraction is performed by a method of using polarized light and serves to determine the stresses in the glass.

According to one known method, a polarized light beam is passed through both the glass ribbon and a quarter-wave plate. Any stresses in the glass ribbon will result in a transformation of the polarized beam. The polarized beam, then, is passed through either a second polarizer or analyzer to a light responsive cell which transduces the light signal to an electric signal.

One polarizer is driven in rotation relative to the other causing the light signal to periodically vary in intensity. The quarter-wave plate is located between the polarizer that is driven and the glass ribbon under test. The presence of the birefringent glass is shown by a phase difference of intensity variations in relation to those corresponding to an isotropic glass (or the absence of glass). It is shown that the phase difference observed depends directly on the stresses present in the ribbon analyzed according to a law whose mathematical expression is:

$$\alpha = P \times C \times d \times \Pi / \gamma \tag{1}$$

wherein:

$\alpha$ is the angle of measurement of the phase difference expressed in radians;

P is a designation of stress;

C is a characteristic constant of the nature of the glass, called the photoelastic or Brewster constant;

d is the thickness of the glass through which the polarized light beam passes; and $\gamma$ is the wavelength of the analysis beam.

The longitudinal stresses in float glass ribbons normally are very much greater than the crosswise stresses when the measurement is taken at a sufficient distance from the end of the glass ribbon. Consequently, the measurement is made only to determine longitudinal stresses. Experience has shown that the distribution of longitudinal stresses in a glass ribbon along a float glass production line remains approximately the same over relatively long periods, and measurements over the entire width of a glass ribbon whose duration is in minutes are well suited for the controls contemplated. For this reason, it is customary to use a mobile measuring unit driven in a back-and-forth crosswise movement. This unit and movement makes it possible to determine continuously the stresses over the entire width of the glass ribbon. A measuring unit of this type is described in U.S. Pat. No. 2,993,402 to Dunipace et al.

While it is possible to follow the described techniques to obtain a measurement of stresses, it has been found in practice that numerous imperfections can compromise the usefullness of the measurement. The imperfections may stem from the choice of the means used in obtaining the measurements. Thus, the means used may fail in precision or the means may not be sufficiently reliable. The imperfections may also stem from physical factors which have not been considered in the methods described and where variations influence the measurements.

SUMMARY OF THE INVENTION

An important aspect of the invention concerns an improvement in obtaining a measurement of stresses. This is a particularly desirable goal since an effort is made scrupulously to respect the tolerances defined by the standards in this field. The margins of systematic uncertainty about the measurement of stresses actually is equivalent to imposing yet a stricter standard to guarantee respect for the official standard.

Moreover, the measurement of stresses, in addition to an aim of control of the conformity of the product that is formed, is aimed at taking corrective action on the product during its production. Thus, if abnormal stresses are detected on the glass ribbon a corrective action, may be taken, such as, for example, by modifying locally the operating heat conditions of the lehr in which the annealing operation is carried out. A knowledge of the condition of stresses in a glass ribbon makes it possible to regulate more precisely the operating conditions. As such, it is possible to improve the overall quality of the product.

There is difficulty in obtaining measurement of stresses in float glass. The difficulty is inherent in the conditions under which the float glass ribbon is fabricated. In particular, for purposes of detection and correction of possible defects in a float glass ribbon, it is desirable to proceed as soon as possible after the glass ribbon leaves the lehr with the taking of measurements. However, as soon as the glass ribbon leaves the lehr it is at a relatively high temperature which may reach or even exceed 100° C. A heat imbalance leading to stresses may exist at that temperature. However, the stresses resulting from heat imbalance are "temporary"

stresses and disappear after complete cooling. Consequently, the temperature will be quite uniform.

In practice, it is important to distinguish between temporary stresses that disappear after the glass ribbon has been brought to ambient temperature and "permanent" stresses which remain after the ribbon of glass is brought to ambient temperature. Experience has demonstrated, under circumstances that there is a temperature gradient within the ribbon of glass on the order of about 12° C., that temperature stresses in the glass ribbon represent a significant part of the measured stresses, possibly reaching or exceeding 50%.

In view of the foregoing discussion, it is an important aspect of the invention to obtain a measurement of stresses in the nature of permanent stresses under circumstances that the glass ribbon is at relatively high temperature, and when the permanent stresses are or may be superposed on temporary stresses.

According to the prior art, an effort was made either to limit the influence of temperature by obtaining a measurement of stresses at a point of progress along the production line when the glass ribbon had a temperature close to ambient temperature, or to estimate approximately the influence of temperature on the measurement taken. According to the latter technique, a systematic correction, taking into account an estimated temperature value, was applied. The technique, as may be apparent, clearly lacks precision.

According to the invention, a measurement of stresses and temperature of the float glass ribbon is taken at various locations crosswise to the direction of advance of the glass ribbon. Accordingly, for any point within the glass ribbon both measurements will be available and the combined data of these measurements makes it possible to determine the permanent stresses in the glass ribbon. Advantageously, the determination of the measurements is performed automatically. According to equation (1), variations in the thickness of the glass ribbon of glass directly effect the precision of the measurement.

As a rule float glass ribbons are found to exhibit a regularity of thickness. Nevertheless, variations in the thickness of float glass ribbons within a very limited range (on the order of 0.02 mm) have been observed. The results of a measurement of stresses have been affected under circumstances of a lack of regularity of thickness of float glass ribbons, even within the aforementioned range, and the affect becomes more perceptible the thinner the glass ribbon. Moreover, the glass ribbon by its very nature of fabrication will exhibit quite often a thickness along its edge which differs from the thickness within the middle part. Therefore, a thickness correction is necessary to properly determine the measurement of stresses along the edges.

Accordingly, it is another aspect of the invention to eliminate as best as possible the imprecision factor on the measurement of stresses caused by any fluctuation in the thickness of the glass ribbon produced by float glass techniques.

In the discussion that follows it is to be noted that the mode of determination of the stresses is not sensitive to possible transmission modifications of the ribbon of glass under study.

The discussion of the improved process of the measurement of stresses and the apparatus for carrying out the process will continue below and for a clearer understanding of the invention the text should be read in conjunction with a consideration of the illustrations within the several sheets of drawings.

BEST MODE FOR CARRYING OUT THE INVENTION

Figure 1:
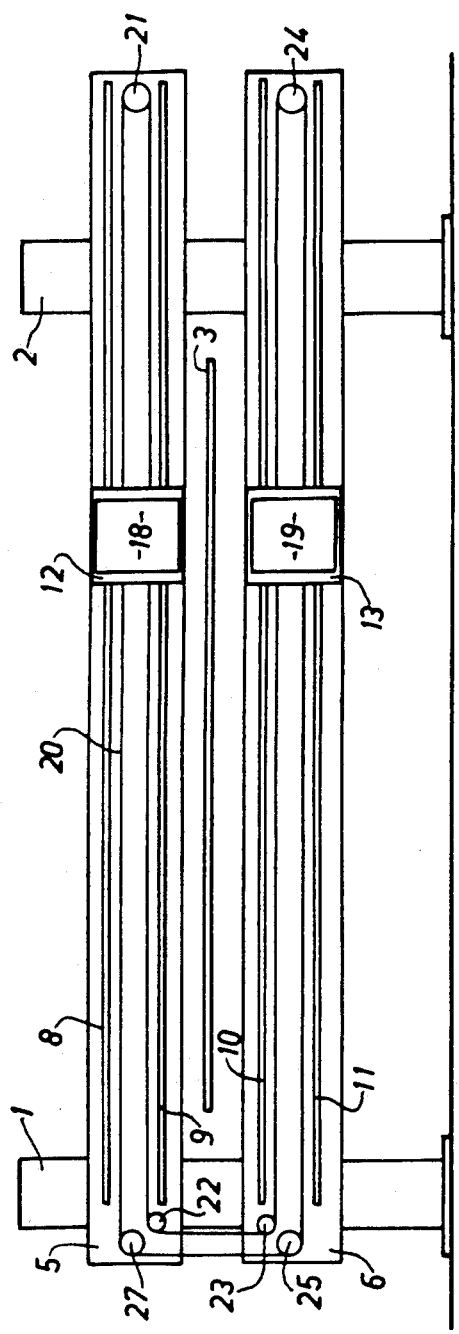
FIG. 1 is a diagrammatic representation of the apparatus of the invention, characterized as a measuring unit, as seen from the front, with a glass ribbon moving in a plane away from the viewer.
Figure 2:
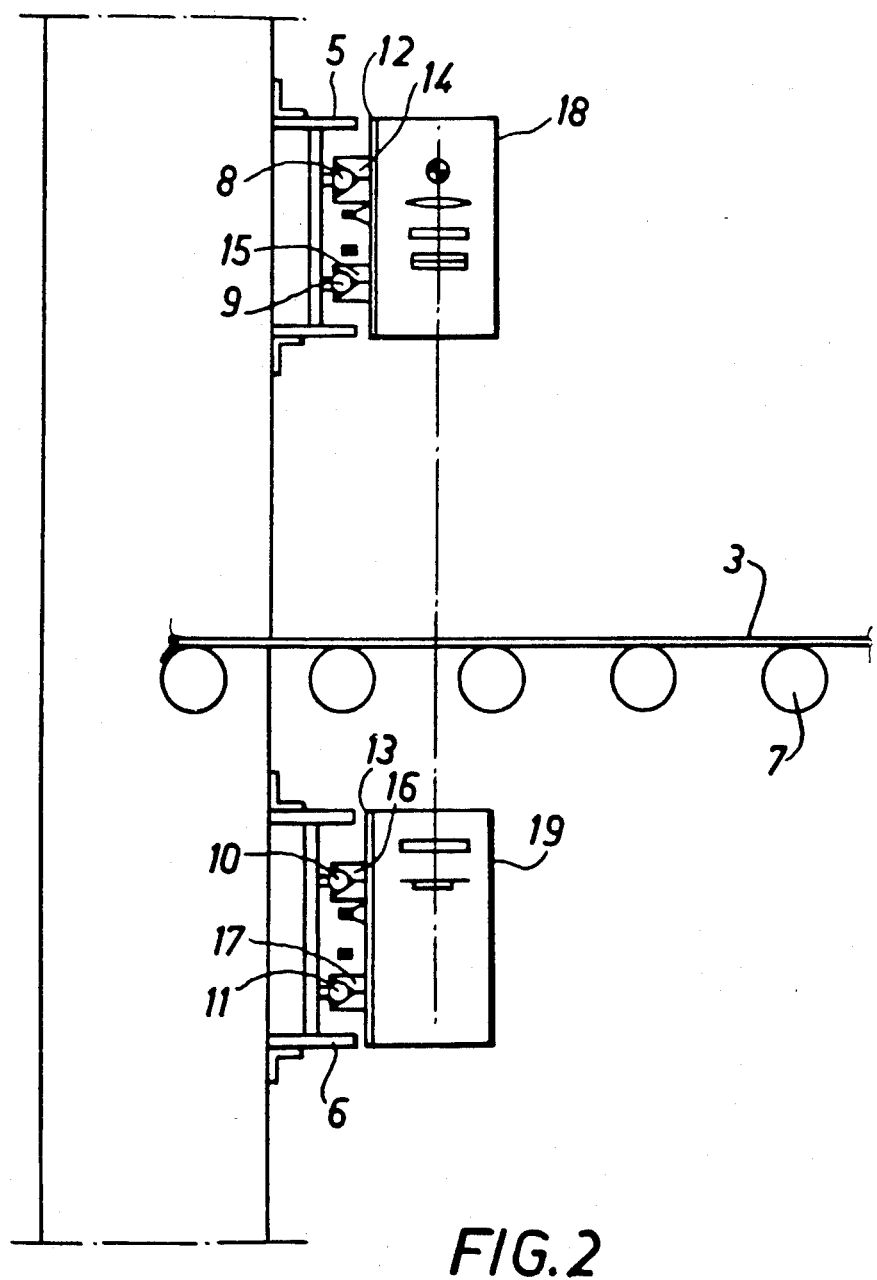
FIG. 2 is a view similar to FIG. 1, illustrating a side view of certain measuring elements of the apparatus.

Referring to FIGS. 1 and 2, it may be seen that the apparatus of the invention is located at the lehr output of a float furnace and that a float glass ribbon 3 (hereafter "glass") is supported by rollers 7 as it exits the lehr. In its diagrammatic form the apparatus characterized as a measuring unit is supported on a gantry formed by a pair of pillars or stanchions 1, 2, and a pair of crossbeams 5, 6. The stanchions extend vertically from a surface, for example, the floor of a plant, on either side of the glass, and the crossbeams are supported by the stanchion in a spaced, horizontal attitude. One crossbeam 5 is located above the glass and the other crossbeam 6 is located below the glass. Each crossbeam has the form of an H-beam (see FIG. 2), and an L-shaped bracket mounts each leg of each crossbeam to a respective stanchion.

A pair of guides 8, 9 are mounted on the crossbeam 5, and a similar pair of guides 10, 11 are mounted on the crossbeam 6. Each guide of the pairs of guides 8, 9 and 10, 11 is supported on a web of a respective crossbeam. Each guide generally has the form of a rail with a cylindrical end which provides a mount for a box 18, 19. The guides of each guide pair are located on the web of a crossbeam, at spaced vertical positions, and extend along the length of each crossbeam. In the mounted orientation box 18 is an upper box and box 19 is a lower box. As will be discussed, the boxes include the various elements used in the measurement of stresses in the ribbon 3.

Referring to FIG. 2, box 18 supports a frame 12 including a pair of slides 14, 15 forming a socket for the cylindrical end of rails 8, 9, and box 19 supports a frame 13 including a pair of slides 16, 17 likewise forming a socket for the cylindrical end of rails 10, 11. The particular manner of mounting a box, for example, the box 18, makes it possible to remove the box temporarily from the apparatus for maintenance without the necessity of disturbing the mechanical assembly providing for its movement along a crossbeam.

A chain 20 drives the upper and lower boxes 18, 19. As illustrated in FIG. 1 the chain is entrained about a series of transmission gear wheels 21, 22, 23, 24 and 25 which serve as idler wheels and a gear wheel 27 which is coupled by a reduction system to a motor (neither the reduction system nor the motor are shown). Gear wheel 27 imparts movement to the chain 20 and, in turn, to boxes 18, 19. Movement of the boxes is rigorously identical.

The boxes may be moved in a similar manner under control of an electrically controlled drive means. The electrical control capability has been found to obviate or avoid any coordination failure in movement that may result from wear of purely mechanical elements.

Figure 3:
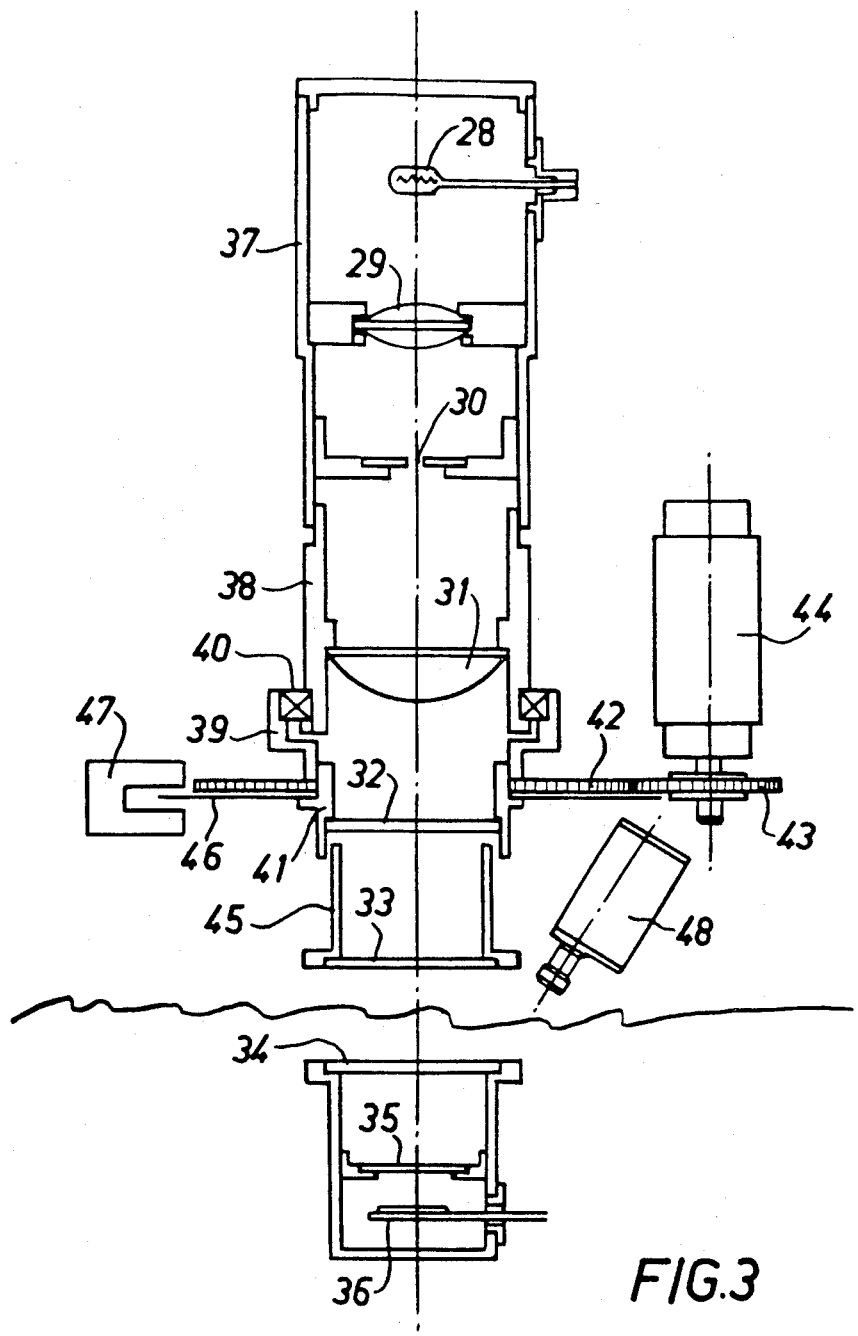
FIG. 3 illustrates an assembly of optical elements for carrying out the invention.

The contents of boxes 18 and 19 are illustrated in FIG. 3. To this end, the upper box 18 contains the various elements to form a point light source and the lower box 19 contains the various elements which respond to the beam of light after passing through the glass 3. The Figure provides only a schematic presentation of the elements and does not illustrate the structure for supporting the elements which may be in the form of collars, flanges and the like.

The light source of the box 18 is formed from light from a white-light bulb 28. A halogen bulb is advantageously used to limit heating problems. The light emitted by the bulb, and imaged on a diaphragm 30 by a lens 29 constitutes the point source. The light of the point source, then, passes through a lens 31 (or an equivalent unit) to form an image either on glass 3 or within the vicinity of the glass to be analyzed. The lens comprises a part of the optics forming the analysis beam.

It is advantageous to limit the zone subjected to light of the analysis beam for obtaining a precise determination of the location of any stress. Advantageously, the zone subjected to the analysis beam will be limited to a diameter of less than 50 mm. Preferably, the zone subjected to the analysis beam will be limited to a diameter of less the 20 mm.

The upper box 18 also houses a polarizer 32 and a quarter-wave plate 33 through which the analysis beam will pass.

With continued reference to FIG. 3, the upper box 18 comprises portions 37, 38 that may be independently adjusted thereby to adjust the relative positioning of the point source and the optics forming the analysis beam. Adjustment is carried out with precision so as not in any way to change the orientation of the optical axis of the optical elements within the upper and lower boxes 18, 19. For a satisfactory measurement the optical axis should be the same throughout the operations. In practice, any difference will not exceed 0.5 mm and, preferably, any difference will be less than 0.2 mm.

The principle behind the measurement of stresses requires either a polarizer or analyzer of the optical elements to be driven in rotation. In either mode of operation, a quarter-wave plate will be located on the side of the glass as determined by the placement of the optical element which undergoes rotational movement.

FIG. 3 illustrates the arrangement of optical structure for one mode of operation. According to this mode a polarizer 32 is driven in rotation and a measurement is taken. Both a quarter-wave plate 33 and the polarizer are supported by the upper box 18. The quarter-wave plate, however, is supported in a static mounted orientation within a portion 45 of the upper box 18. An analyzer 34 is supported in a static mounted orientation within the lower box 19.

Polarizer 32 is mounted by a mount 41 which, in turn, is carried by flange 39. The mount and flange may be secured together by one or more machine screws (not shown). A bearing unit 40 at the lower end of portion 38 of the upper box 18 supports the flange for free rotation relative to the portion 38 and lens 31. A gear wheel 42 (only a part of the gear wheel has been shown) imparts a rotational movement to the assembly including flange 39, mount 41 and polarizer 32. The gear wheel is located between and connected directly to the flange 39 and mount 41. The gear wheel is driven by gear wheel 43 at the output drive of a synchronous motor 44.

A disc 46 rotates with gear wheel 42. The disc includes a multiplicity of slots or perforations located at a regular spacing around its periphery. The disc and a rider 47 comprise an optical coding device. The rider, see FIG. 3, is of C-shaped outline whose opening between a pair of legs is directed toward the upper box 18. A light source, is located in one leg and a light sensitive cell is oppositely located in the other leg. The arrangement of the rider and disc, the latter of which is of a diameter greater than that of gear wheel 42 thereby to enter into the opening, provides a signal as each perforation is positioned to allow light from the light source to fall on the light sensitive cell. The optical coding device will be more particularly described below.

A device 48 for measuring the temperature of the glass is associated with the apparatus. The temperature measuring device may be an optical pyrometer, located either within the upper box 18 or the lower box 19. The lens of the pyrometer is directed to aim at the same range of surface of glass as that observed for the measurement of stresses. Preferably, and as illustrated, the optical pyrometer is located within the upper box. This location of the optical pyrometer will substantially overcome the possibility of a deposit of dust of the lens.

The optical pyrometer should have a relatively high sensitivity since the temperature of the glass will be on the order of 100° C. and the temperature gradients to be detected in the glass normally do not exceed some forty degrees.

It is known that the measurement taken with an optical pyrometer is very sensitive to conditions which may be external to the measurement. Thus, to avoid any error, it is advisable to periodically calibrate the optical pyrometer. Since the optical pyrometer is driven in the same movement as the means used for measuring the double refraction it may be recalibrated periodically (optionally at each cycle corresponding to a back-and-forth movement). Calibration may be performed, for example, on a glass sample maintained at a constant temperature. The sample may be heated by a heating plate controlled by a thermostat to a constant temperature.

In addition, the optical pyrometer should exhibit good sensitivity to radiation emitted by the glass, and it should be virtually insensitive to ambient light. The choice of the radiation, moreover, should be indifferent to the thickness of the glass being checked. Further, the air should be transparent to the radiation in question. Advantageously, according to the invention, the optical pyrometer employed should work on a radiation corresponding to a narrow wavelength band between 4.5 and 5.5 micrometers. Preferable, the band will be between 4.8 and 5.2 micrometers and centered on 5 micrometers.

It is also important to select a pyrometer having a short response time. This selection will be the case even for conditions during which the emissivity is slight.

Since the measurement of stresses is made during movement of the measuring device, the longer the response time, the greater the diminution of resolution. Since the data of a measurement is derived during movement, rather than being derived instantaneously the data will establish an average value over a range whose amplitude is determined by the response time of the pyrometer. The shorter the response time, the narrower the range. At the temperatures contemplated, and considering the sensitivity of existing optical pyrometers, a response time necessary for operation should be the order of a second or less. The response time may be reduced by modifying (slowing) the rate of movement of the measuring device.

As illustrated in FIG. 3, the optical pyrometer 48 directed toward the point of the glass 3 observed for the measurement of stresses is located so that the axis of the lens of the pyrometer forms an angle with the vertical of about 30°. Actually, the sight of the optical pyrometer may be arranged at an angle less than 30° and, in fact, it may be desirable to locate the sight of the pyrometer perpendicular to the surface of the glass to limit the risk of undesirable radiation. The arrangement, also, permits the pick up of the maximum energy of the radiation. Therefore, the perpendicular arrangement of the optical pyrometer makes it possible to operate with increased sensitivity.

When the sight of the optical pyrometer is perpendicular to the surface of glass 3, the zones observed for temperature and the measurement of stresses are at any given instant different even though they may be closely spaced. Thus, the arrangement of the optical pyrometer having a sight is at a perpendicular requires continuous correction. The correction may be carried out by the introduction of a time delay into the measuring system. The time delay will cause the measurements made for the same point to coincide. The difference introduced will be a function of the distance between the two zones observed and the speed of translation of the measuring device.

Figure 5:
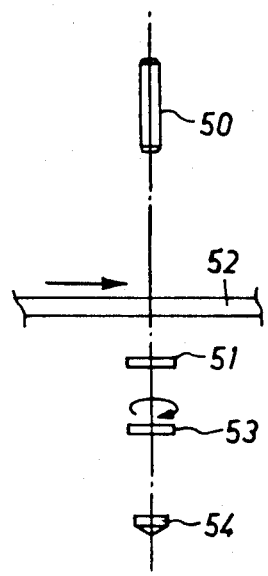
FIG. 5 is a diagram illustrating a simplified optical assembly employing a laser source.

Several modifications of structure forming the measuring device are contemplated. For example, the light source 28, the optical components including lens 29 and diaphragm 30 which constitute the point source, lens 31 and the various mounts may be replaced by a laser source. This is possible since the beam produced by a laser source is geometrically very well defined. The structure, as illustrated in FIG. 5, may be further modified by use of a polarized laser source. As illustrated, a polarized laser source 50 is located to one side of a glass ribbon 52 under study, while a quarter-wave plate 51, an analyzer 53, and a receiving cell 54 are located on the other side of the glass ribbon. Precision of the measuring device may be increased by use of a laser source that is monochromatic. In this modification, the polarizer 32 is not used and the analyzer is driven in rotational movement.

In the expression above, the measurement is inversely related to the wavelength of the beam from the point source. The choice of a monochromatic light eliminates the dispersion that necessarily accompanies the use of a white light, and the phenomena observed are better defined. The quarter-wave plate can be chosen to correspond exactly to that of the point source. As a non-limiting example, the point source may be an He-Ne laser having a wavelength of 632.8 nm.

Figure 4:
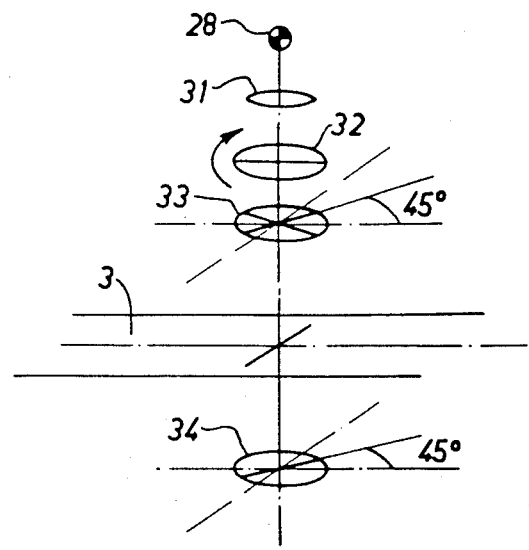
FIG. 4 illustrates the relative angular positions of the optical elements of FIG. 3.

Measurement of stresses is performed by one of the traditional modes of compensation including the Senarmont and Friedel (or Tardy) modes. The elements used in these measurements lead to some differences, but the resulting analysis is essentially of the same nature. The Friedel-type operation is illustrated in FIGS. 3 and 4, and generally characterized as a mode of operation providing a measurement through rotation of polarizer 32 and the static mounting of both the quarter-wave plate 33 and analyzer 34. In this mode of operation, the quarter-wave plate is disposed on the same side of the glass as the rotating element and the analyzer is disposed on the other side of the glass. The Senarmont-type operation is one that may generally be characterized as a mode providing a measurement through rotation of an analyzer. Again, both the quarter-wave plate and polarizer are stationarily mounted and the quarter-wave plate is disposed on the same side of the glass as the rotating analyzer. The polarizer is mounted on the side of the glass opposite the analyzer.

The quarter-wave plate, according to either mode, is angularly positioned so that its neutral lines are located at an angle from the direction of advance of the glass, that is, from the direction of the stresses to be measured. The angle preferably is 45°. The analyzer (see FIG. 4) is similarly positioned. The angular displacement of the quarter-wave plate and analyzer will provide a maximum of sensitivity in the measurement technique. Actually, there is a maximum difference between the minimum and maximum light intensity received. For a monochromatic light beam the minimum is even zero.

If the optical principle of the apparatus is carefully respected, the intensity of light transmitted by the analyzer will vary with the rotation of the analyzer sinusoidally over time. Introduction of the birefringent glass in the path of the beam produces a phase difference of intensity minima and maxima. This phase difference makes it possible to determine the value of the stresses. A photosensitive element 36 functions to transform the variations in light intensity into an electric signal. A filter 35 functions to eliminate all undesirable radiations capable of disturbing the measurement. The filter 35 is located between the analyzer 34 and photosensitive element 36.

The bandpass of the filter will be determined as a function of the source, and the other optical elements forming the light beam. If, for example, the apparatus uses a quarter-wave plate corrected for values of 400 and 700 nm it may be advantageous to choose a filter whose bandpass is located in the same corrected range.

Figure 6:
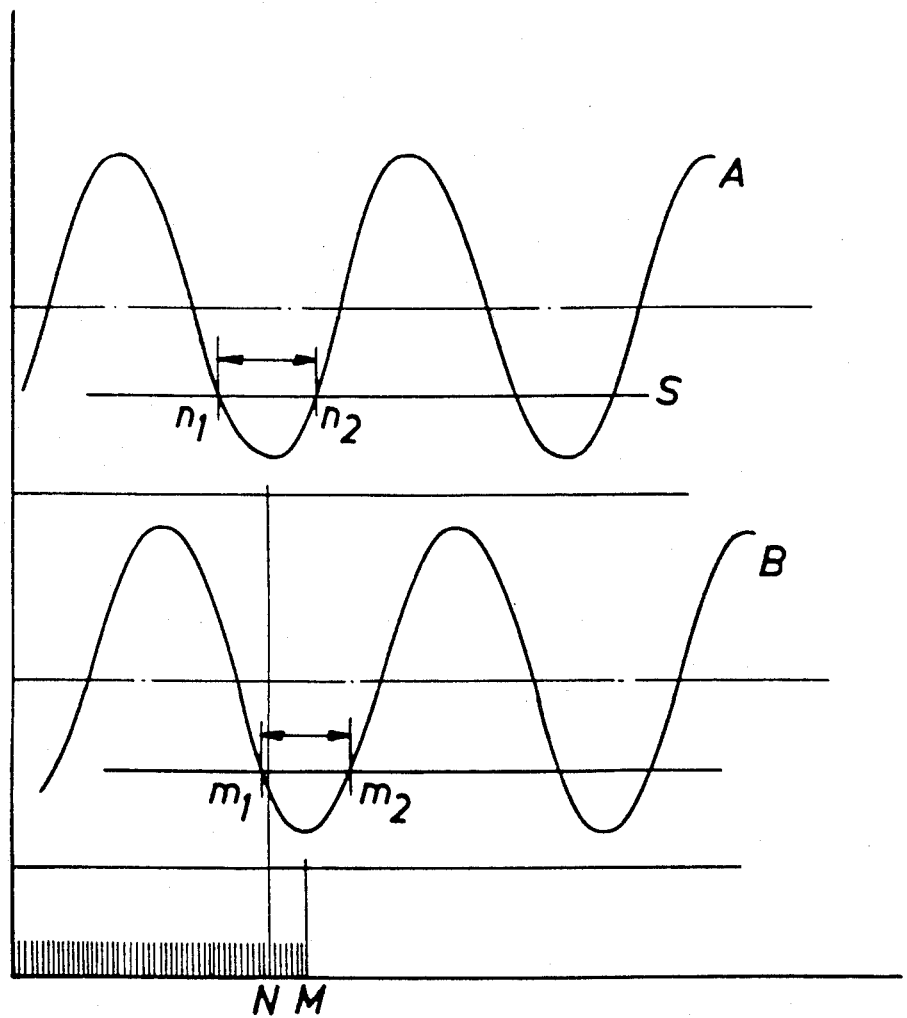
FIG. 6 illustrates a mode of determining a phase difference used for calculating stresses.

FIG. 6 illustrates the principle of the phase difference measurement introduced during measurement of stresses. Curve A represents diagrammatically the general appearance of the intensity received by the photosensitive cell as a function of time. The periodicity of the phenomenon is determined by the speed of rotation of the polarizer. The line S represents a threshold set in a processing unit. The line is located to cut off the intensity curve of the minima in a way that is clear and not too divergent.

The signals communicated by photosensitive cell 36 and pulses received from optical coder 47 are processed simultaneously by a data processing unit. The operation is performed by determining an intensity minima. The operation equally as well could be performed by determining an intensity maxima. Given the lack of precision in the determination of these individual points, an indirect determination is made by setting the threshold. The position of the minimum is calculated as being equidistant from two neighboring points $n_1$, $n_2$ at the intersection between curve A and line S. Even if the curve is not rigorously symmetrical, the error committed in this way is considerably less than an error that would systematically result from the direct determination of the minima. The "position" of the points of intersection of curve A and line S, and consequently with that of the minima, is located in relation to the pulses counted by the optical coder 47. The pulses comprise the signal emitted by the optical coder as each perforation in disc 46 is positioned between the photocell and a light source. The higher the number of pulses per revolution of disc 46, the greater the precision of the measurement. In practice, the disc will include at least 2000 perforations, and preferably 4000 perforations or more.

A measurement begins when the apparatus is on the side beyond the glass ribbon. At this time the phase difference is zero and the position of the sine curve established acts as a reference. Upon crosswise movement, when the apparatus moves above the glass the sine curve produced is out of phase in relation to the sine curve previously produced. The divergence between the minima defined by the number of pulses of the optical coder separating the minima is the measurement of this phase difference.

Importantly, the counting system of the invention and the results of the measurement of stresses is not affected by a faltering or simply an imprecise functioning of the motor driving the revolving polarizer. Counting down of the pulses, by design is rigorously linked to the movement of the polarizer. This is not the case in apparatus for which the movement is defined by a chronometric measurement. Further, the means for analysis and processing of the signals also receive data from the optical pyrometer representative of the temperature of the glass in the zone examined. Thus, a correction of the stresses preferably is automatically established so that the analysis and processing means will determine directly a value of the permanent stresses.

The temperature correction is established according to the following relationship:

$$P = (P_m - E) \times a \times \Delta T \tag{2}$$

wherein
  $P_m$ is a measurement of stresses;
  E is Young's modulus;
  α is a coefficient of expansion; and
  ΔT is the difference between the measured temperature and the average temperature of glass as determined over the entire width of the glass.

According to the invention the thickness of glass may be determined by optical methods. A preferred method uses a geometrically well defined light beam (a laser beam, for example) directed toward a point along the glass 55 that is being studied (see FIG. 7). The light beam will be directed at a well defined angle of incidence (i) to obtain a reflection from both faces of the glass. The plane of the angle of incidence is in the direction of the length of the glass.

The most significant variations in thickness of the glass will appear as cylindrically shaped undulations having only slight amplitude whose generatrices are located in the direction of advance of the glass.

Figure 7:
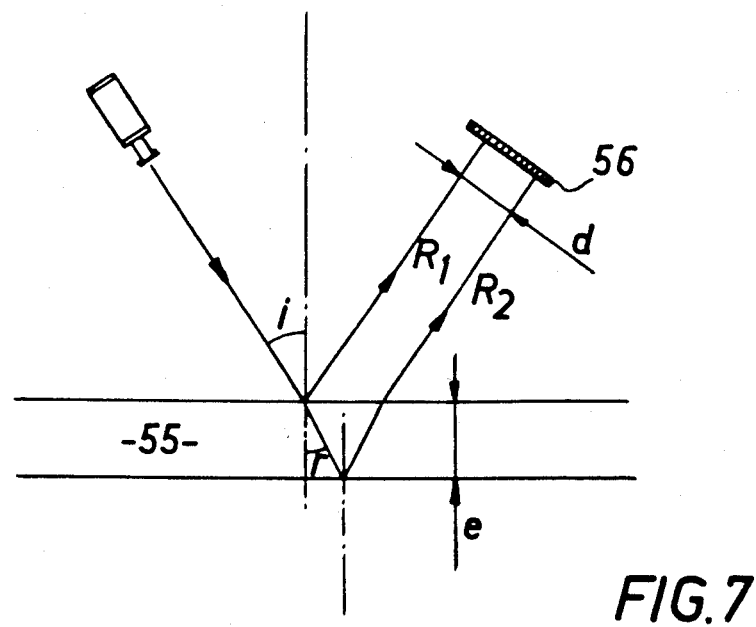
FIG. 7 illustrates in diagrammatic form the principle of a mode of measuring the thickness of the glass ribbon.

Referring still to FIG. 7, the angle of incidence is illustrated as being relatively large, on the order of 30. The illustration is for purposes of facilitating understanding and it is to be understood that a beam of light having an angle of incidence close to normal may be preferred. What is required is that the light beam reflected on the upper face of the glass exhibit an intensity that is slightly different from the intensity of the beam reflected on the lower face of the glass.

A beam $R_1$ is reflected on the upper face of the glass 55, and a beam $R_2$ is reflected on the lower face of the glass. A photosensitive detector 56 made up of multiple small-sized photodiodes, each placed side by side, is responsive to the beams. A distance d separating the two beams and linked directly to thickness e of the glass may be determined. For small incident angles, the thickness of the glass may be expressed as $$e = nd/2i \tag{3}$$

wherein
  i is the angle of incidence; and
  n is the index of the glass.

A measurement of time, in an analogous treatment, may be used rather than the measurement of distance. The principle is illustrated diagrammatically in FIG. 8.

Figure 8:
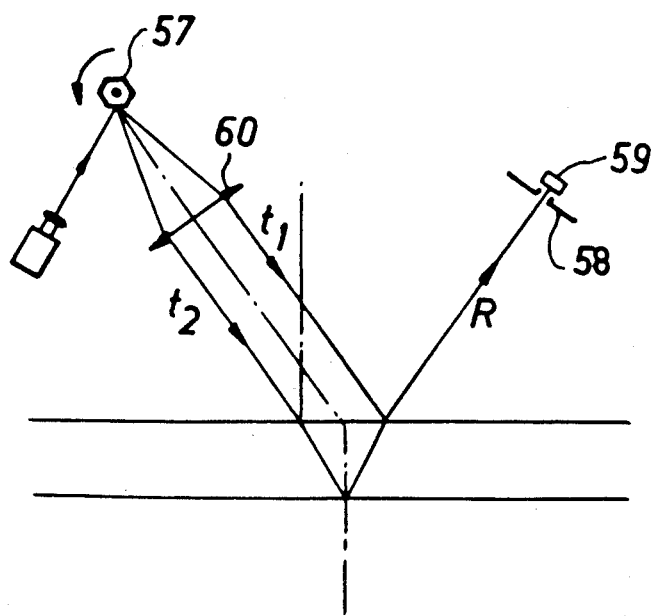
FIG. 8 illustrates in diagrammatic form another mode of measuring the thickness of the glass ribbon.

According to FIG. 8, a light beam is reflected on a mirror 57 revolving at a high angular speed. The source of the light beam is located so that the beam will reflect from each mirror toward a lens 60 which columnates the beam in the plane of the Figure toward the glass. Accordingly, a reflected beam will scan a segment of the glass. A diaphragm 58 of small size is placed in the path scanned by the beam reflected at the surface of the glass. Placement is such that the diaphragm receives alternately the beam reflected on the upper and lower faces of the glass. The beam reflected from the upper face of the glass will be at time $t_1$, and the beam reflected from the lower face of the glass will be at time $t_2$. If the angular speed of mirror 57 is known, the measurement of the time interval separating the two signals received at photocell 59, beyond the diaphragm, represents the angle by which the mirror has revolved. The particular angle, under circumstances that there is coincidence of the two reflections, is geometrically linked to the thickness of the glass. Both of the reflections provide for a determination of thickness of glass with a great precision. In fact, it is possible to determine thickness variations on the order of 10 micrometers. The measurement of thickness is used directly by the processing means to correct the measurement of stresses.

Taking into account the various corrections introduced, the values determined make it possible to assess the final state of the stresses for glass at ambient temperature as well as the temporary stresses which may be important in the adjustments applied in the annealing treatments.

According to the invention, it is possible, also, to associate the measuring means with means for adjusting the heat treatment so that any necessary correction is made automatically according to instructions previously introduced in a memory.

The apparatus of the invention may be further described by way of the discussion to follow. To this end, the measuring unit is located at the output of the float glass annealing enclosure for taking various measurements of a glass whose temperature is around 100° C. The glass will be in the form of a ribbon having a width of 3200 mm and a thickness of 7 mm. The thickness which is that of equilibrium of the glass on the tin bath leads to a glass whose edges have a thickness virtually the same as the thickness of the remaining portion of the glass. The glass is moved at a speed of 7 m/min. The apparatus is driven across beams 5, 6 from one side of the glass to the other and traverses the glass in one minutes' time. The measurements may be made during traverse of the glass in one direction or during traverse of the glass in both directions.

The speed of movement may be modified but the response times of the measuring devices, particularly the device for temperature measurement, must be kept in mind. There is no benefit in increasing scanning frequency since variations to be detected are relatively slow and the modifications of the adjustments of the heat treatments, because of the thermal inertia of the lehr, are not quickly felt. Accordingly, very fast responses normally are not necessary. The important point to be kept in mind is that drifts in functioning over long functioning periods are to be detected and corrected.

The equilibrium time for temperature measurement should be on the order of 5 seconds. This takes into consideration the temperature level and the sensitivity of the optical pyrometer. The equilibrium time will be equivalent to determining the average temperature of the glass over ranges representing one-twelfth of the width of the glass, or 250 mm. Considering that the temperature gradients in the width of the glass are progressive, this mode of measurement has been found to be sufficient.

The polarizer is driven at a speed of 360 rpm by a synchronous motor having a 1800 rpm output. The measurement of the thickness of the glass is continuous and instantaneous.

Figure 9:
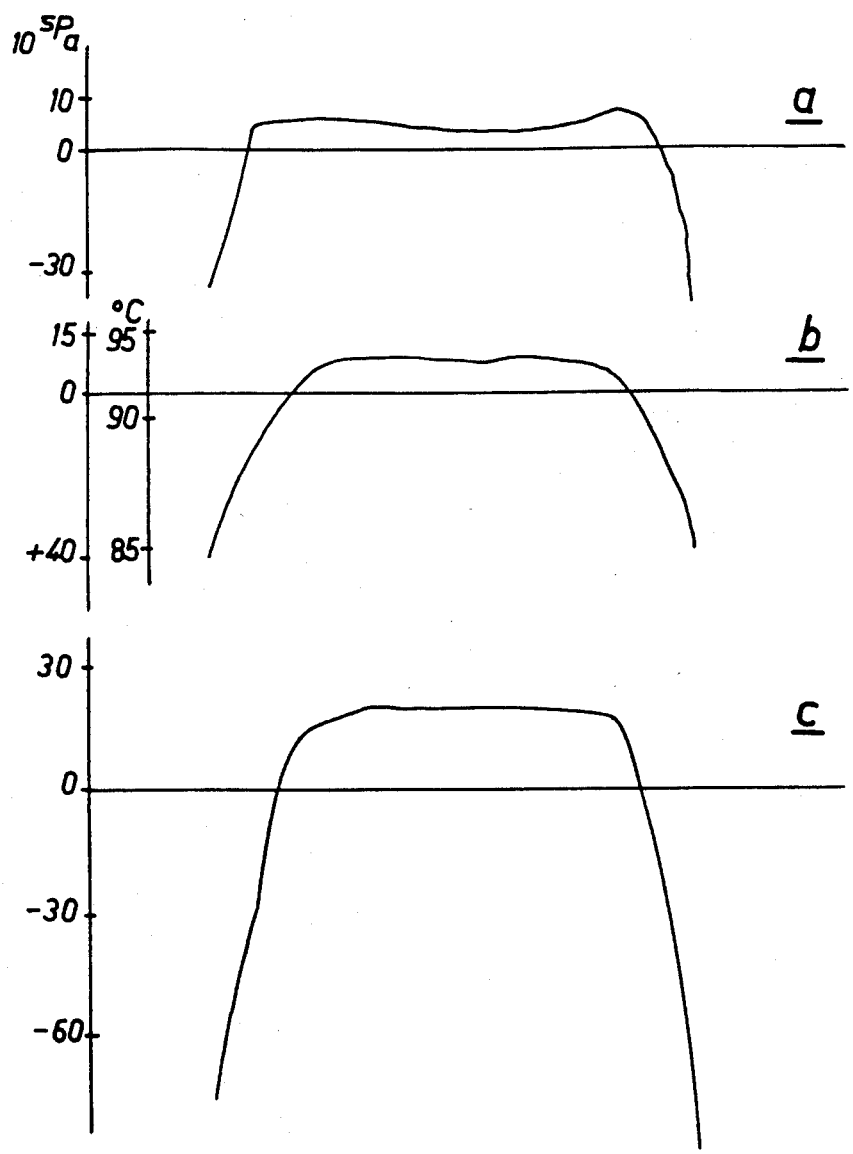
FIG. 9 is a graphic display of the data of the measurement of stresses and temperature determined crosswise to the glass sheet.

Refer now to FIG. 9 which illustrates the stress variations (measured and corrected) and the temperature variations over the entire width of the glass. Specifically, curve a represents the measured stresses, curve b represents temperature and stresses resulting from the temperature, and curve c represents residual stress corresponding to a difference between curves a and b. The abscissa of each graph represents the measurement taken across the entire width of the glass. The stresses observed are in compression along the edges and in tension within the middle part of the glass.

As may be seen, the temperatures in the middle part of the glass are higher than the temperatures along the edges of the glass. A correction of the stresses measured as a function of the temperature leads to very different residual stresses, although the measured temperature gradients are relatively slight (about 25° C.). The example given clearly demonstrates the importance of the correction of measurements according to the invention.

We claim:

1. Apparatus for measuring permanent longitudinal stresses in a float glass sheet during location of the sheet along a production line, said apparatus comprising a mechanical unit, means for supporting said mechanical unit over said sheet and driving the same in translation crosswise of said sheet, means for measurement continuously of any double refraction in the sheet according to one of the Friedel and Senarmont methods, said measurement means including a first light source, a first polarizer for polarizing a beam of light from said light source, means for transforming said polarized beam to a circular beam, a second polarizer, a first photosensitive receiver for transforming a sensed intensity of light beam to an electric signal, each of said light source, first and second polarizer, transforming means and first photosensitive receiver located along a linear optical path and one of said polarizers being driven in a continuous rotational movement, means for measuring the temperature of said sheet at a location within said sheet coincident with the point of measurement and at the time of mesurment of any double refraction, means for recording and processing said measurements of stresses and temperature calculating the permanent longitudinal stresses, and means mounting said measurement means on said mechanical unit.

2. The apparatus of claim 1 further comprising an optical coding device including a disc, a second light source located on one side of said disc, and a second photosensitive receiver located on the opposite side of said disc, said disc being mounted on said polarizer driven in continuous rotational movement and movable conjointly with said polarizer, said disc further being provided with a multiplicity of openings that individually position themselves during rotation between the second light source and second photosensitive receiver to pass intermittently a beam of light from the second light source, and wherein the position of said disc and consequently that of the revolving polarizer serves a base for determining the measurement of double refraction as well as to define a count down of the pulses received by a detector for each opening that shall permit passage of light from the second light source to the second photosensitive receiver.

3. The apparatus of claim 1 wherein said temperature measuring means comprises an optical pyrometer having a sensitivity to wavelengths between 4.5 and 5.5 micrometers.

4. The apparatus of claim 3 wherein said optical pyrometer is mounted by said means mounting said measurement means on said mechanical unit so that said optical pyrometer and said measurement means move conjointly.

5. The apparatus of claim 4 further including a light beam emitter for measuring thickness of said sheet, said light beam emitter providing a light beam directed on said sheet at the location of measurement of said double refraction, and a receiver responsive to the distance separating a beam reflected from each of the two surfaces of said sheet.

6. A process for measuring permanent longitudinal stress in a float glass sheet along a production line, directing a beam of polarizing light toward a location within said sheet, responding to the intensity of said beam of light which shall pass through said sheet and any variation in intensity indicative of stresses which create a double refraction, transducing said response to a signal representative at any time to the quality of the sheet measured, continuously moving said beam of polarizing light across the width of said sheet to measure stresses at adjacent locations, simultaneously measuring the temperature at each said location across the width of said sheet to which said polarizing light is directed for measuring stresses, and combining said signal and response to temperature measurement from each location to provide a value of permanent stresses throughout the entire width of said sheet.

7. The process of claim 6 wherein said measurement of temperature at each location across the width of said sheet is taken optically from radiation emitted by the sheet.

8. The process of claim 7 wherein said measurement of temperature is taken optically from radiation emitted by the sheet corresponding to a wavelength between 4.5 and 5.5 micrometers.

9. The process of claim 6 or 7 wherein the measurement of temperature is taken following periodic calibration of said optical device.

10. The process of claim 6 or 7 wherein the measurements of temperature across the width of said sheet are recorded and processed automatically to establish an average value of temperature.

11. The process of claim 6 or 7 further including taking an optical measurement of thickness of said sheet at each location across said sheet.

12. The process of claim 11 further including providing a source of monochromatic beam for said optical measurement of thickness, and directing said beam on said sheet to obtain a reflection from both its surfaces, and wherein the distance separating the two reflections is an indirect measurement of the thickness of said sheet.

13. The process of claim 11 further including providing a source of a monochromatic beam for said measurement of thickness of said sheet, directing said beam toward a face of a mirror for reflecting said beam toward said sheet and ultimately toward a photosensitive cell adapted to respond to said reflected beam from opposite surfaces of said sheet, said mirror including a plurality of faces which locate in the path of said beam from said source and adapted to revolve at an angular velocity, positioning a diaphragm in the path of said reflected beam between said sheet and said photosensitive cell, and wherein said diaphragm is arranged so that it alternately receives a reflection from the two surfaces of said sheet, and wherein said angular velocity of movement of said mirror and faces may be varied to cause said reflections from the surfaces of said sheet to be coincident, said angular velocity of said mirror corresponding to thickness of said sheet.

* * * * *

UNITED STATES PATENT AND TRADEMARK OFFICE
CERTIFICATE OF CORRECTION

PATENT NO. : 4,619,681

DATED : October 28, 1986

INVENTOR(S) : Roger Tetaz and Philippe Vizet

It is certified that error appears in the above-identified patent and that said Letters Patent is hereby corrected as shown below:

```
Within the masthead of the patent, at paragraph [30]
change "Apr. 16, 1984" to --Apr. 19, 1984--
```

Signed and Sealed this

Third Day of March, 1987

*Attest:*

DONALD J. QUIGG

*Attesting Officer*   *Commissioner of Patents and Trademarks*